United States Patent
Repiscak et al.

(10) Patent No.: US 11,293,148 B2
(45) Date of Patent: Apr. 5, 2022

(54) STEP ASSEMBLY AND WALKWAY FOR A SCREED

(71) Applicant: Caterpillar Paving Products Inc., Brooklyn Park, MN (US)

(72) Inventors: Monica Repiscak, Plymouth, MN (US); John E Jorgensen, Andover, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 279 days.

(21) Appl. No.: 16/291,573

(22) Filed: Mar. 4, 2019

(65) Prior Publication Data
US 2020/0283969 A1  Sep. 10, 2020

(51) Int. Cl.
*E01C 19/42* (2006.01)
*B60R 3/00* (2006.01)

(52) U.S. Cl.
CPC ............. *E01C 19/42* (2013.01); *B60R 3/00* (2013.01); *E01C 2301/40* (2013.01)

(58) Field of Classification Search
CPC .................................................. E01C 2301/40
See application file for complete search history.

(56) References Cited

U.S. PATENT DOCUMENTS

| | | | | |
|---|---|---|---|---|
| 1,182,563 A | * | 5/1916 | Hild | B60R 3/02 182/89 |
| 3,517,942 A | * | 6/1970 | Cuffe | B60R 3/02 280/166 |
| 4,159,122 A | * | 6/1979 | Stevens | B60R 3/02 108/134 |
| 4,496,265 A | * | 1/1985 | Fragale | E01C 19/185 404/110 |
| 4,541,661 A | * | 9/1985 | Hawk | B60R 19/56 182/89 |
| 6,533,303 B1 | * | 3/2003 | Watson | B60R 3/02 182/150 |

(Continued)

FOREIGN PATENT DOCUMENTS

EP  0314574 A1 * 5/1989 ............ E01C 19/20
JP  2009287351 A  12/2009

OTHER PUBLICATIONS

Caterpillar Inc., "AP300F Paver", https://www.cat.com/en_US/products/new/equipment/asphalt-pavers/wheel-asphalt-pavers/1000012240.html, Mar. 2016, 2 pages.

(Continued)

*Primary Examiner* — Thomas B Will
*Assistant Examiner* — Katherine J Chu
(74) *Attorney, Agent, or Firm* — Harrity & Harrity LLP

(57) ABSTRACT

A step assembly may include a first step support member and a second step support member to be connected to a screed frame, and a step frame movably connected to the first step support member and the second step support member. The step frame may be movably connected to the first step support member by a first pin engaged with the first step support member and a slot of the step frame. The step frame may be movably connected to the second step support member by a second pin engaged with the second step support member and an aperture of the step frame. The step frame may be biased to a position relative the first step support member and the second step support member by a first biasing member and a second biasing member.

20 Claims, 6 Drawing Sheets

(56) References Cited

U.S. PATENT DOCUMENTS

| | | | | |
|---|---|---|---|---|
| 7,219,910 | B2* | 5/2007 | Dunford | B60R 3/00 |
| | | | | 182/127 |
| 7,413,377 | B2* | 8/2008 | Pontano, III | E01C 19/48 |
| | | | | 404/101 |
| 8,136,826 | B2* | 3/2012 | Watson | B60R 3/002 |
| | | | | 280/166 |
| 8,820,468 | B2* | 9/2014 | Sekiya | F01N 13/009 |
| | | | | 180/309 |
| 9,371,628 | B2* | 6/2016 | Erdtmann | E01C 19/405 |
| 9,963,838 | B2* | 5/2018 | Oettinger | E01C 19/405 |
| 10,422,087 | B2* | 9/2019 | Anheier | E01C 19/48 |
| 10,718,092 | B2* | 7/2020 | Anheier | E01C 19/48 |
| 2003/0188925 | A1* | 10/2003 | Korpi | B60R 3/02 |
| | | | | 182/127 |
| 2014/0216849 | A1* | 8/2014 | Ellwein | E01C 19/48 |
| | | | | 182/82 |
| 2018/0037166 | A1* | 2/2018 | Hunter | B60R 3/007 |
| 2019/0315278 | A1* | 10/2019 | Watson | H01H 13/06 |
| 2020/0300038 | A1* | 9/2020 | Pinnock | E06C 1/383 |

OTHER PUBLICATIONS

Caterpillar Inc., "SE34 Screed", https://www.equipmentworld.com/caterpillar-launches-ap500555f-ap300355f-pavers-with-new-screed-heating-system-flexible-consoles/, Mar. 28, 2016, 1 page.

* cited by examiner

STEP ASSEMBLY AND WALKWAY FOR A SCREED

TECHNICAL FIELD

The present disclosure relates generally to a screed and, more particularly, to a step assembly for a screed that maintains a step in an orientation that permits standing by a user during a movement of the screed, and a walkway for the screed that remains centered with the step assembly during the movement of the screed.

BACKGROUND

A paving machine can be used in the laying of bituminous roadway mat. The typical paving machine employs a screed assembly (sometimes referred to as a floating screed) for spreading and compressing a bituminous material to form a smooth surfaced roadway mat. The screed assembly typically has many degrees of freedom of movement. For example, the screed assembly may be capable of various movements about a central line (e.g., lateral portions of the screed assembly may move independently about the central line) that changes an angle that the screed assembly makes with the roadway mat. This permits the screed assembly to compress the bituminous material into a curved or a sloping configuration that introduces a water drainage gradient to the roadway mat.

Often, the screed assembly has a walkway member to allow personnel (e.g., an operator, members of a paving crew, and/or the like) to stand in a position near the roadway mat and observe the paving process, and a step assembly to permit the personnel to travel from the walkway member to a platform of the screed assembly. The walkway member and the step assembly are typically connected to one side of the screed assembly (e.g., connected to one of the lateral portions of the screed assembly) to avoid stress on the walkway member and/or the step assembly that otherwise would occur if the walkway member and/or the step assembly were attached to both sides of the screed assembly (e.g., from torque applied by the independent movements of the lateral portions of the screed assembly).

However, the attachment of the walkway member and step assembly to one side of the screed assembly can cause a tilting of the step assembly, as well as cause the step assembly and walkway member to become off-centered, during a movement of the screed assembly. This may result in skewed viewing angles for personnel standing on the walkway member or the step assembly and may make travel across the step assembly more strenuous and difficult for personnel.

The step assembly and the walkway member of the present disclosure can be used in a screed assembly in order to solve one or more of the problems set forth above and/or other problems in the art.

SUMMARY

According to some implementations, the present disclosure is related to a screed assembly. The screed assembly may include a screed frame, a first step support member connected to the screed frame, a second step support member connected to the screed frame, and a step frame movably connected to the first step support member and the second step support member. The step frame may be movably connected to the first step support member by a first pin engaged with the first step support member and a slot of the step frame. The step frame may be movably connected to the second step support member by a second pin engaged with the second step support member and an aperture of the step frame. The step frame may be biased to a position relative the first step support member and the second step support member by a first biasing member disposed between the step frame and the first step support member and a second biasing member disposed between the step frame and the second step support member.

According to some implementations, the present disclosure is related to a screed assembly. The screed assembly may include a screed frame, a walkway projection extending from a portion of the screed assembly, and a walkway member connected to the screed frame. The walkway member may be pivotal between a standing position and a stowed position. The walkway member may include a catch that surrounds a distal portion of the walkway projection in the standing position, and one or more bumper members proximate the distal portion of the walkway projection in the standing position or the stowed position.

According to some implementations, the present disclosure is related to a step assembly. The step assembly may include a first step support member to be connected to a screed frame, a second step support member to be connected to the screed frame, and a step frame movably connected to the first step support member and the second step support member. The step frame may be movably connected to the first step support member by a first pin engaged with the first step support member and a slot of the step frame. The step frame may be movably connected to the second step support member by a second pin engaged with the second step support member and an aperture of the step frame. The step frame may be biased to a position relative the first step support member and the second step support member by a first biasing member disposed between the step frame and the first step support member and a second biasing member disposed between the step frame and the second step support member.

DETAILED DESCRIPTION

Figure 1:
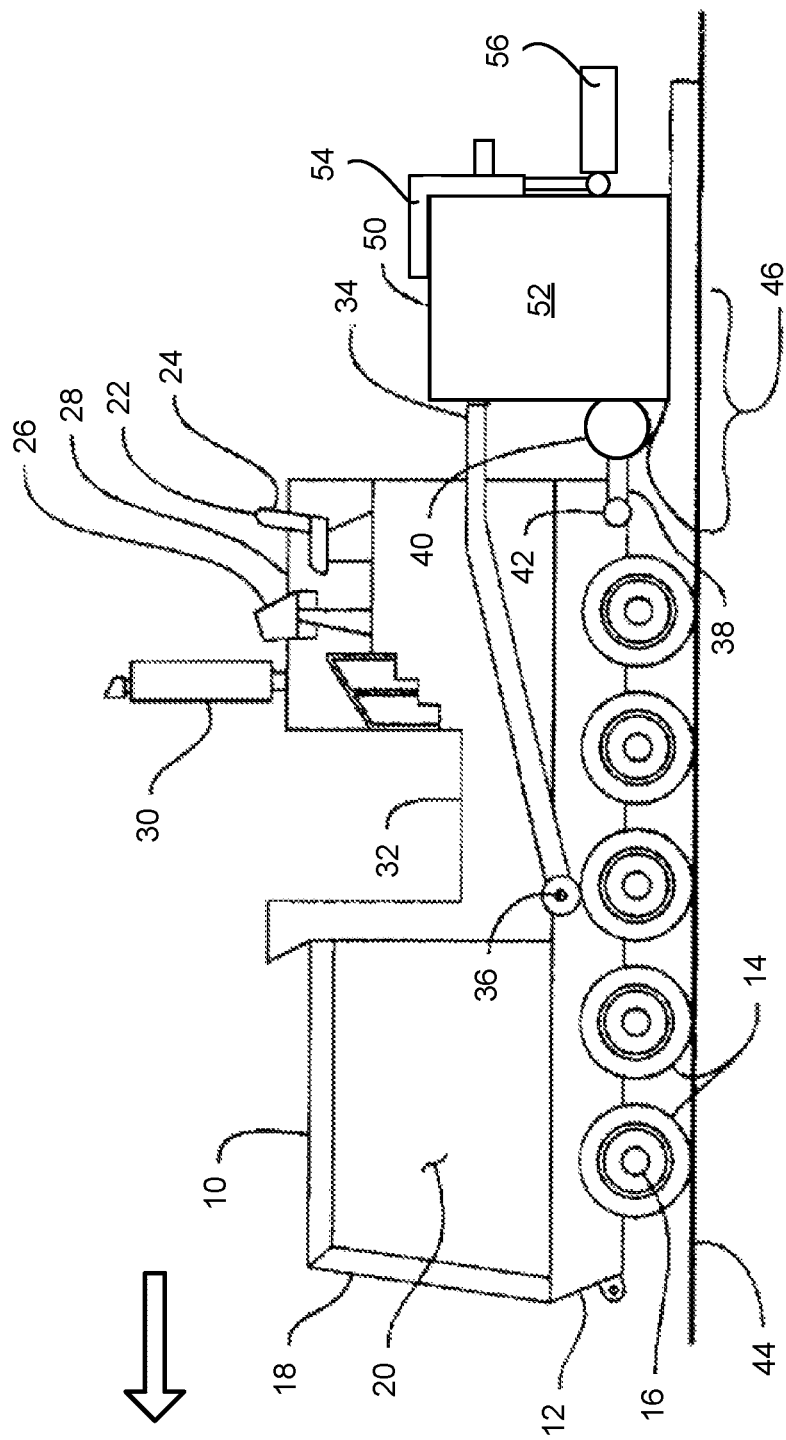
FIG. 1 is a diagram of an example paving machine that includes a screed assembly.

FIG. 1 is a diagram of an example paving machine 10 that includes a screed assembly 50. As shown, paving machine 10 may include a frame 12 that is supported by and transported upon a plurality of transport wheels 14 oppositely disposed on axles 16 that extend underneath frame 12 transverse to a direction of motion of paving machine 10. A hopper 18 may be disposed on a forward portion of frame 12. Hopper 18 may include sides 20 extending vertically from frame 12 so that hopper 18 can receive material (e.g., a fume-emitting bituminous aggregate material, such as asphalt) from a transport vehicle (e.g., a dump truck), and retain the material in hopper 18 pending disposition of the material on a surface to be paved by paving machine 10.

As shown, towards a rear of the frame 12, an operator station 22 may be provided so that an operator seated at a chair 24 can control operation of paving machine 10 by way of controls provided on a control panel 26. Also disposed toward the rear of the frame 12 may be an engine housing 28 on which is provided an exhaust stack 30 for exhausting combustion by-products of engine housing 28. As further shown, a walkway area 32 may be provided between hopper 18 and engine housing 28 in order to permit access by personnel across paving machine 10, to engine housing 28, or to other machinery and components that may be disposed or mounted upon the paving machine 10.

As further shown in FIG. 1, a screed assembly 50 may be (e.g., pivotally) connected to frame 12 by a set of screed support arms 34. In some cases, the set of screed support arms 34 may be substantially parallel and horizontal to one another, being disposed along frame 12 and pivotally connected to frame 12 at arm pivot 36, which has a horizontal axis transverse to the direction of travel of paving machine 10, thus permitting vertical movement of screed assembly 50. While not shown, paving machine 10 may include a limiting member that limits and/or controls vertical movement of screed assembly 50. Screed assembly 50 as shown is comprised of screed frame 52, step assembly 54, and walkway member 56.

As further shown, paving machine 10 may include an aggregate disposition member 38. Aggregate disposition member 38 may include an auger 40 (e.g., a flighted auger) disposed adjacent a rear of frame 12 in an approximate horizontal and axially transverse position with respect to the direction of travel of paving machine 10. As further shown, an auger support member 42 may be arranged for controlling a position of aggregate disposition member 38.

As further shown, paving machine 10 may operate on and along a prepared roadbed surface 44 with hopper 18 facing the direction of travel so as to receive and contain a material. A quantity of the material may be deposited (e.g., at a selected volumetric flow rate) from paving machine 10 in a section of material reservoir 46 preceding screed assembly 50.

As indicated above, FIG. 1 is provided as an example. Other examples may differ from what is described in connection with FIG. 1. For example, although paving machine 10 is described as a wheel-type paver, the implementations described herein may be equally suitably employed on a track-type paver.

Figure 2:
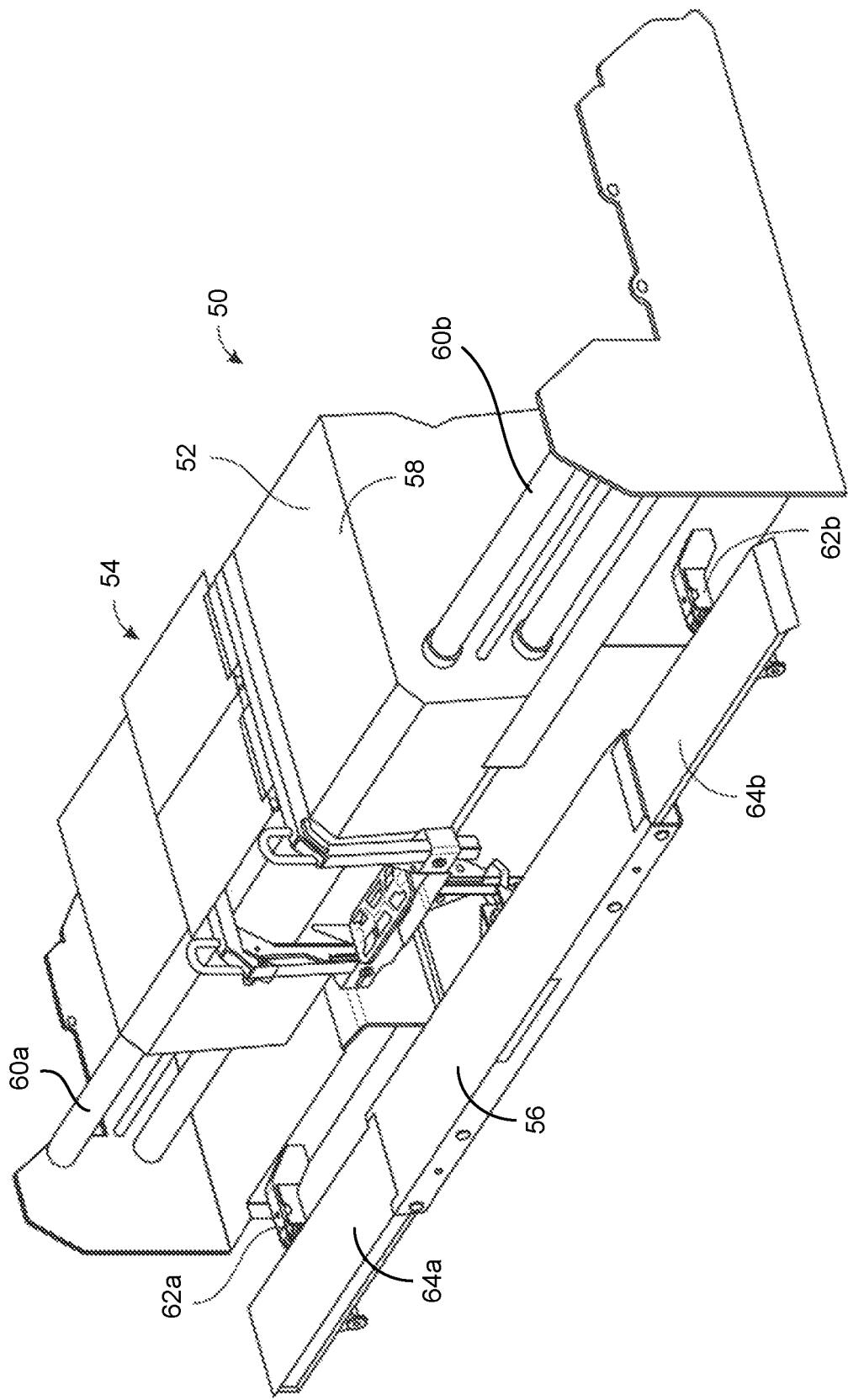
FIG. 2 is a diagram of an example screed assembly, including a step assembly and a walkway member, that may be used with the paving machine of FIG. 1.

FIG. 2 is a diagram of a perspective view of an example of a screed assembly 50, including a screed frame 52, a step assembly 54, and a walkway member 56, that may be used in paving machine 10.

With reference to FIG. 2, screed frame 52 of screed assembly 50 includes a main screed body 58 and screed extensions 60, which are slidingly attached to main screed body 58 to allow an operator to control and/or select a width of screed frame 52. Screed frame 52 provides a structure to which various operational components (e.g., crown systems, hydraulic systems, etc.) may be mounted. Screed frame 52 may be connected to paving machine 10 in an approximate horizontal and transverse position with respect to the direction of travel of paving machine 10. A central line of screed frame 52 may define lateral portions of screed frame 52. The lateral portions of screed frame 52 may be independently movable about the central line to permit screed frame 52 to perform movements associated with paving operations of screed assembly 50. For example, screed frame 52 may perform a crowning movement (e.g., a positive crowning movement or a negative crowning movement) whereby the lateral portions are vertically displaced at the central line to produce an arch shape (e.g., a convex arch or a concave arch) of screed frame 52. Screed frame 52 additionally may perform a cross-sloping movement whereby the lateral portions are rotated in opposite directions to produce an inverted V-shape of screed frame 52.

Step assembly 54 may be connected to screed frame 52 (e.g., to main screed body 58), as shown and described below with regard to FIG. 3, to permit personnel to travel from walkway member 56 to a platform formed by step assembly 54.

Walkway member 56 may be pivotally connected to screed frame 52 at one or more connection interfaces 62 in an approximately parallel position with respect to screed frame 52. In some implementations, walkway member 56 may be connected to screed frame 52 at a connection interface 62*a* with a first lateral portion of screed frame 52 (e.g., screed extension 60*a*) and a connection interface 62*b* with a second lateral portion of screed frame 52 (e.g., screed extension 60*b*). Walkway extensions 64 of walkway member 56 may adapt a width of walkway member 56 according to a width of screed frame 52 produced by screed extensions 60.

Connection interface 62 may be a mating couple (e.g., a hinge, a pin joint, a ball-and-socket joint, etc.) with a first member of the mating couple included on screed frame 52 (e.g., screed extension 60) and a second member of the mating couple included on walkway member 56 (e.g., walkway extension 64). Walkway member 56 may pivot between a standing position (i.e., an approximately horizontal orientation proximate a roadway mat that permits standing by personnel during a paving operation) and a stowed position (i.e., a stowed orientation distanced from the roadway mat suitable for travel by paving machine 10 between paving operations) along an axis defined by connection interfaces 62.

As indicated above, FIG. 2 is provided as an example. Other examples may differ from what is described in connection with FIG. 2.

Figure 3:
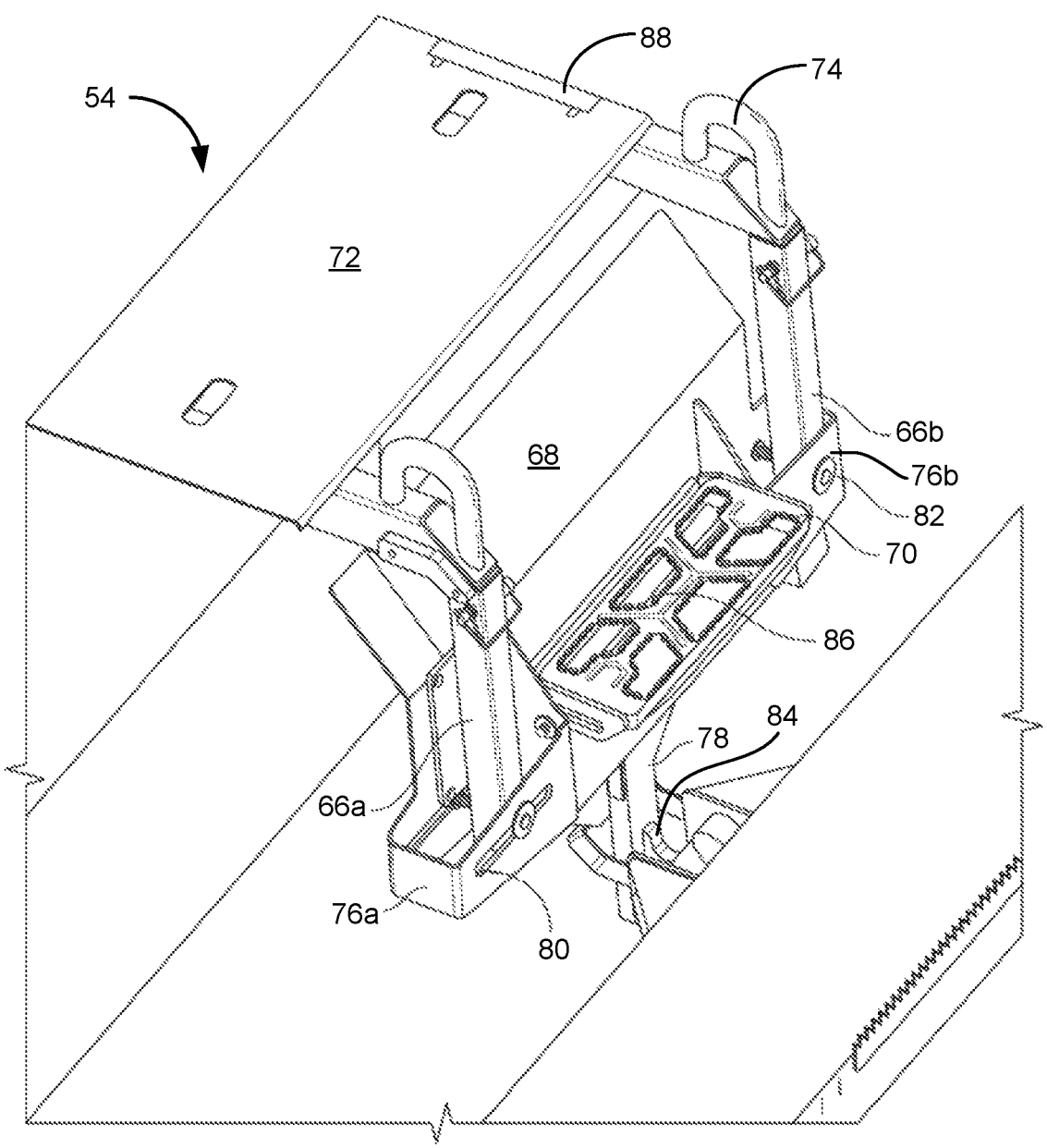
FIG. 3 is a diagram of an example step assembly that may be used with the screed assembly of FIG. 2.

FIG. 3 is a diagram of a perspective view of an example step assembly 54 that may be used with screed assembly 50. Step assembly 54 may include a pair of step support members 66, a step frame 68, a step 70, and one or more platform covers 72 that define a platform of step assembly 54.

Step support members 66 may be connected (e.g., by welding, fasteners, etc.) to screed frame 52 (e.g., at main screed body 58) and/or to a crown system associated with the screed frame 52. In some implementations, step support member 66*a* may be connected to the first lateral portion of screed frame 52 and step support member 66*b* may be connected to the second lateral portion of screed frame 52 such that step assembly 54 straddles the central line of screed frame 52.

Step support members 66 may be brackets (e.g., L-shaped brackets) including a horizontal leg positioned horizontally along a top side of screed frame 52 and a vertical leg, approximately orthogonal the first leg, that is positioned vertically along a side of screed frame 52 that is orthogonal the top side. Step support members 66 may include a handrail 74 that personnel can grasp during travel across step assembly 54.

Step frame 68 may include a pair of wells 76, a walkway projection 78, a slot 80, and an aperture 82. Step frame 68 may be a single component (e.g., a die cast component, an additive manufactured component, etc.) or may be multiple components that are joined into a single component (e.g., by welding, fasteners, etc.).

Step frame 68 may include a well 76*a* at a first lateral end portion of step frame 68 and a well 76*b* at a second lateral end portion of step frame 68. Wells 76 may include a bottom wall adjoined with a front wall (i.e., a wall parallel, and nearest, to screed frame 52), a rear wall (i.e., a wall opposite the front wall), a proximal wall (i.e., a wall adjacent step 70), and a distal wall (i.e., a wall opposite the proximal wall) that extend orthogonally from the bottom wall to define an interior space (e.g., a well). An end portion of step support member 66*a* (e.g., an end portion of the vertical leg of step support member 66*a*) may be disposed in the interior space of well 76*a*, and an end portion of step support member 66*b* (e.g., an end portion of the vertical leg of step support member 66*b*) may be disposed in the interior space of well 76*b*.

Step frame 68 may include a walkway projection 78 extending from step frame 68. Walkway projection 78 may extend downwardly from step frame 68 orthogonal to the bottom walls of wells 76. Walkway projection 78 may include a bumper projection 84 extending orthogonally from a distal portion of walkway projection 78.

Step frame 68 may include a slot 80 and an aperture 82. In some implementations, one or more walls of well 76*a* may include slot 80 (e.g., the front wall and/or the rear wall) and one or more walls of well 76*b* may include aperture 82 (e.g., the front wall and/or the rear wall). For example, a wall (e.g., the front wall) of well 76*a* may include a slot 80 that is in alignment with a slot 80 in an opposite wall (e.g., the rear wall) of well 76*a*, and a wall (e.g., the front wall) of well 76*b* may include an aperture 82 that is in alignment with an aperture 82 in an opposite wall (e.g., the rear wall) of well 76*b*.

Step assembly 54 may include a step 70. Step 70 may be connected to step frame 68 by a rod 86 engaged with step 70. A first end of rod 86 may be pivotally engaged with step frame 68 (e.g., with a proximal wall of well 76*a*) and a second end of rod 86 may be pivotally engaged with step frame 68 (e.g., with a proximal wall of well 76*b*) to permit step 70 to pivot with respect to a longitudinal axis of step 70 between a standing position (i.e., an approximately horizontal orientation that permits standing by personnel) and a stowed position (i.e., an approximately vertical position such that step 70 does not obstruct the movement of personnel traversing walkway member 56). As described above, step frame 68 is movably connected to step support members 66 such that step 70 is maintained in the standing position during a movement of screed frame 52 (e.g., a positive crowning movement, a negative crowning movement, and/or a cross-sloping movement).

Step assembly 54 may include one or more platform covers 72 extending from step support member 66*a* (e.g., the horizontal leg of step support member 66*a*) to step support member 66*b* (e.g., the horizontal leg of step support member 66*b*) to define a platform on the top side of screed frame 52 on which personnel can stand (e.g., to observe paving operations or to access operator controls). Platform cover 72 may be connected to step support member 66*a* or 66*b* (e.g., the horizontal leg of step support member 66*a* or 66*b*) by a hinge 88 to permit platform cover 72 to pivot outwardly from screed frame 52, thereby providing access to components internally mounted to screed frame 52 (e.g., a crown system).

As indicated above, FIG. 3 is provided as an example. Other examples may differ from what is described in connection with FIG. 3.

Figure 4:
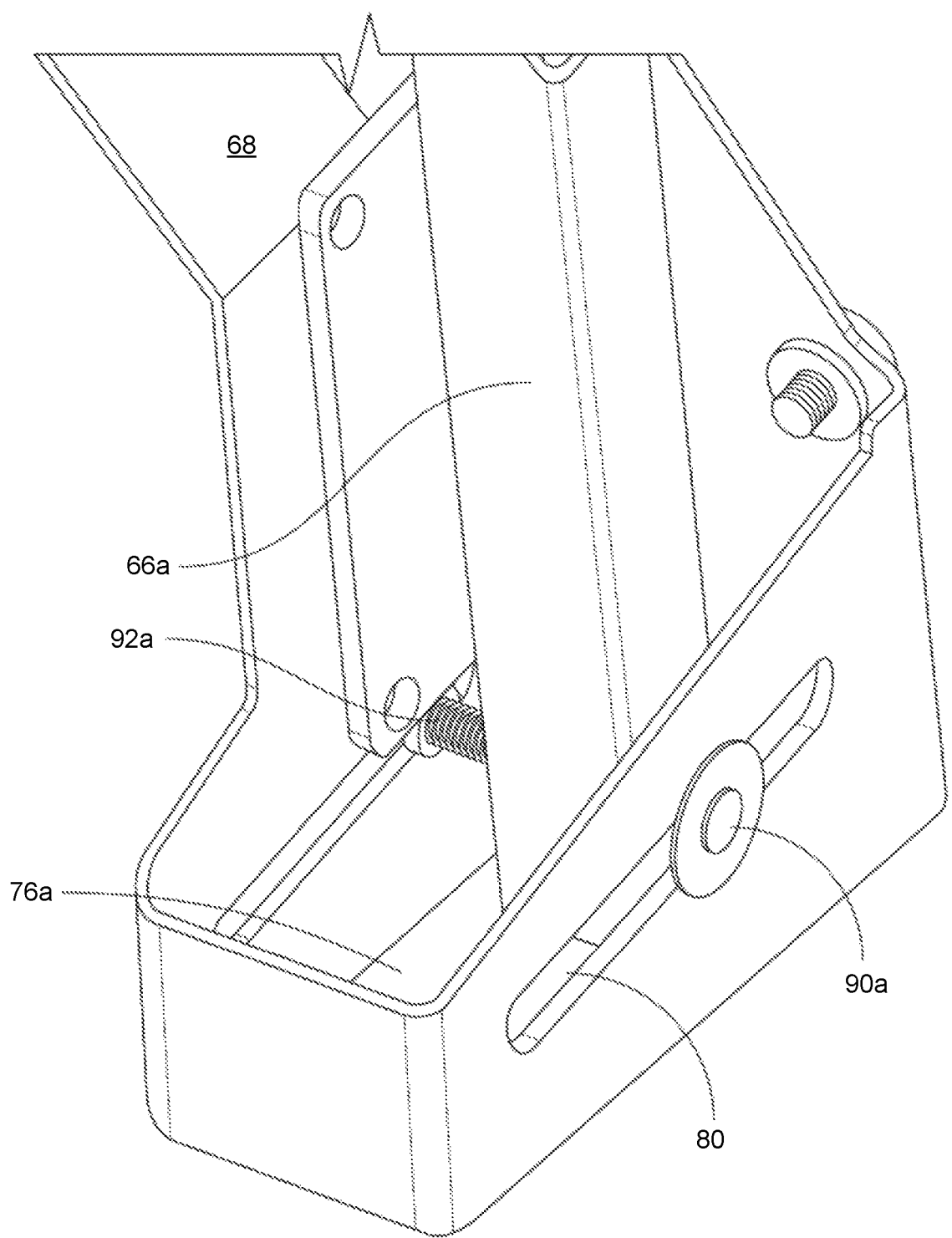
FIGS. 4 and 5 are diagrams of example implementations of a connection between a step support member and a step frame that may be used with the step assembly of FIG. 3.

FIG. 4 is a diagram of a perspective view of an example implementation of a connection between step frame 68 and step support member 66*a* that may be used with step assembly 54. Step frame 68 may be movably connected to step support member 66*a* by a pin 90*a* engaged with step support member 66*a* (e.g., the end portion of the vertical leg of step support member 66*a*) and slot 80 of step frame 68. Slot 80 may be slidably engaged with pin 90*a* such that step frame 68 is slidable along pin 90*a* in a direction parallel to a width of screed frame 52. Slot 80 also may be pivotally engaged with pin 90*a* such that step frame 68 is pivotal about pin 90*a* with respect to an axis defined by pin 90*a*.

Pin 90*a* may include a shaft portion dimensioned to pass through slot 80 and head portions at a first end and a second end of the shaft portion. The head portions may be dimensioned so as not to pass through slot 80. Additionally, or alternatively, washers that are dimensioned so as not to pass through slot 80 may be received on the shaft portion adjacent the head portions. The head portion at one of the first end or the second end of the shaft portion may be removable (e.g., a nut) or attached (e.g., by welding) to the shaft portion after pin 90*a* is engaged with step support member 66*a* and slot 80. In some implementations, pin 90*a* may pass through a slot 80 in a wall (e.g., the rear wall) of well 76*a*, the end portion of the vertical leg of step support member 66*a*, and a slot 80 in an opposite wall (e.g., the front wall) of well 76*a* such that the head portions of pin 90*a* are positioned at the exterior of well 76*a*.

Step frame 68 may be biased to a position relative step support member 66*a* by a biasing member 92*a*. For example, biasing member 92*a* may bias step frame 68 such that an inward surface of a wall (e.g., the rear wall) of well 76*a* abuts step support member 66*a*. Step frame 68 may be displaced from the position during a movement of screed frame 52 (e.g., a cross-sloping movement) such that biasing member 92*a* transitions from an uncompressed state to a compressed state. After the movement of screed frame 52, biasing member 92*a* may return step frame 68 to the position.

Biasing member 92*a* may be disposed between step frame 68 and step support member 66*a*. For example, biasing member 92*a* may be disposed between an end portion of step support member 66*a* (e.g., an end portion of the vertical leg of step support member 66*a*) and an inward surface of a wall (e.g., the front wall) of well 76*a*. Biasing member 92*a* may be a spring (e.g., a coil spring, a torsion spring, etc.), a resilient member (e.g., a rubber disc), a pair of opposing magnets, etc. In some implementations, biasing member 92*a* may be a coil spring in which pin 90*a* is disposed.

As indicated above, FIG. 4 is provided as an example. Other examples may differ from what is described in connection with FIG. 4.

Figure 5:
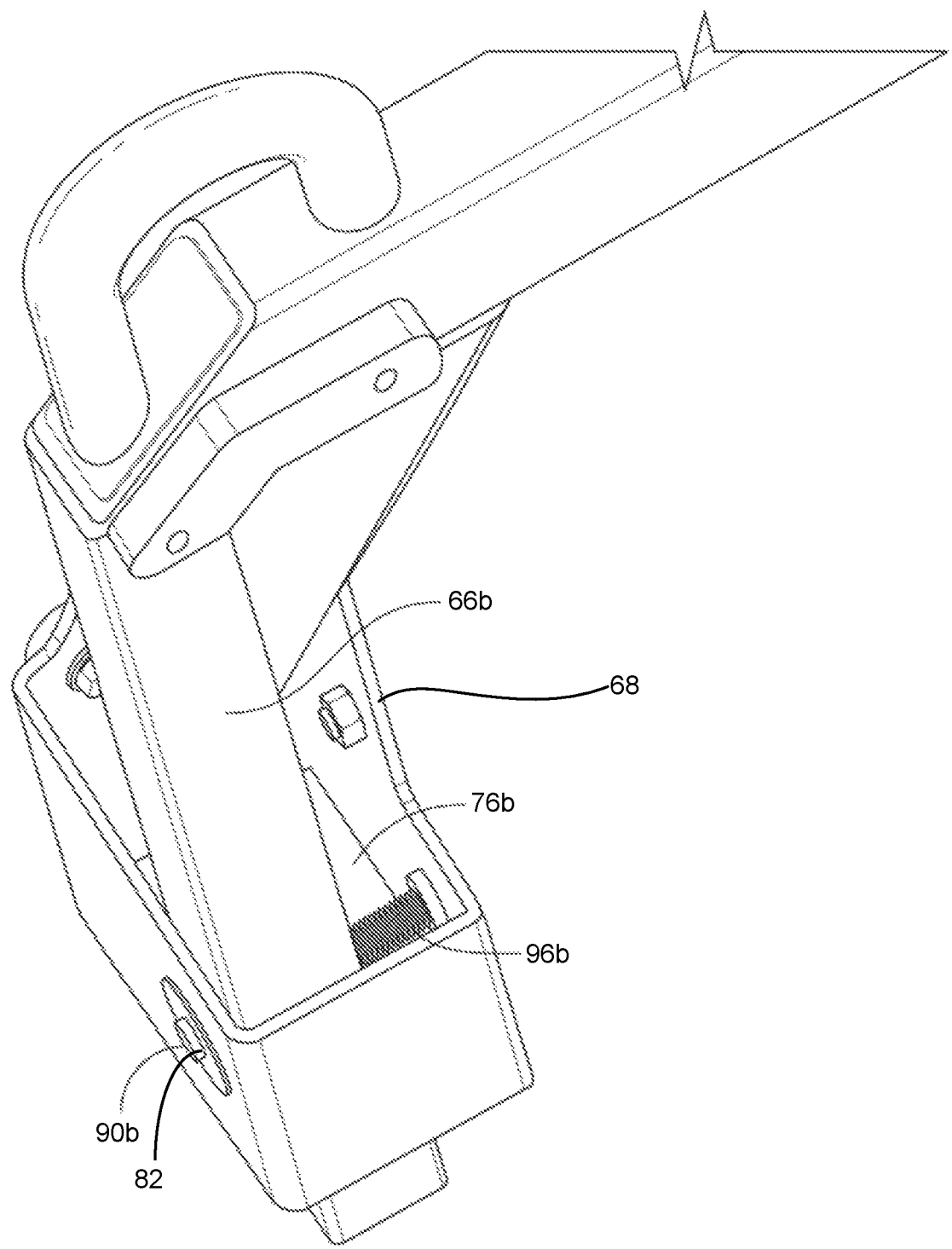

FIG. 5 is a diagram of a perspective view of an example implementation of a connection between step frame 68 and step support member 66*b* that may be used with step assembly 54. Step frame 68 may be movably connected to step support member 66*b* by a pin 90*b* engaged with step support member 66*b* (e.g., the end portion of the vertical leg of step support member 66*b*) and aperture 82 of step frame 68. Aperture 82 may be pivotally engaged with pin 90*b* such that step frame 68 is pivotal about pin 90*b* with respect to an axis defined by pin 90*b*.

Pin 90*b* may include a shaft portion dimensioned to pass through aperture 82 and head portions at a first end and a second end of the shaft portion. The head portions may be dimensioned so as not to pass through aperture 82. Additionally, or alternatively, washers that are dimensioned so as not to pass through aperture 82 may be received on the shaft portion adjacent the head portions. The head portion at one of the first end or the second end of the shaft portion may be removable (e.g., a nut) or attached (e.g., by welding) to the shaft portion after pin 90b is engaged with step support member 56b and aperture 82. In some implementations, pin 90b may pass through an aperture 82 in a wall (e.g., the rear wall) of well 76b, the end portion of the vertical leg of step support member 66b, and an aperture 82 in an opposite wall (e.g., the front wall) of well 76b such that the head portions of pin 90b are positioned at the exterior of well 76b.

Step frame 68 may be biased to a position relative step support member 66b by a biasing member 92b in a similar manner as described above with regard to FIG. 4.

As indicated above, FIG. 5 is provided as an example. Other examples may differ from what is described in connection with FIG. 5.

Figure 6:
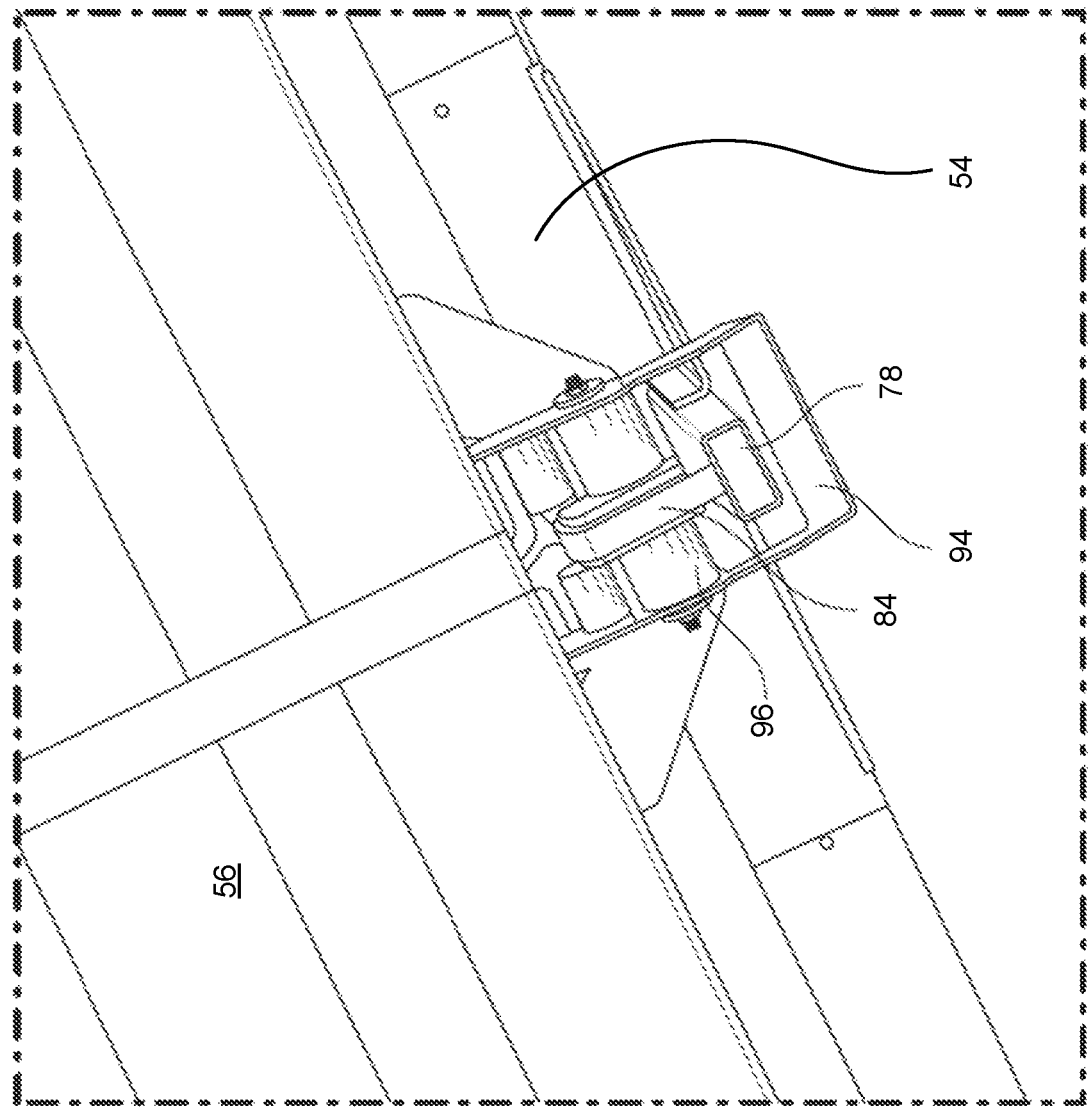
FIG. 6 is a diagram of an example implementation of an interface between a walkway member and a walkway projection of a step frame that may be used with the screed assembly of FIG. 2.

FIG. 6 is a diagram of a bottom perspective view of an example implementation of an interface between walkway member 56 and walkway projection 78 of step frame 68.

Walkway member 56 may include a catch 94 that surrounds a distal portion of walkway projection 78 when walkway member 56 is in the standing position, as described above. Catch 94 may be configured to clear a distal portion of walkway projection 78 when walkway member 56 is pivoted to permit walkway member 56 to transition from the standing position to the stowed position. During a movement of screed frame 52 that results in a rearward movement of walkway member 56, or a forward movement of step assembly 54, catch 94 engages walkway projection 78 to maintain a position of walkway member 56 relative to step assembly 54.

Walkway member 56 also may include one or more bumper members 96 proximate the distal portion of walkway projection 78 (e.g., proximate bumper projection 84) when walkway member 56 is in the standing position or stowed position, as described above. During a movement of screed frame 52 that results in a lateral movement of walkway member 56 or step assembly 54, a bumper member 96 may contact the distal portion of walkway projection 78 (e.g., bumper projection 84) to maintain a position of walkway member 56 relative to step assembly 54 (e.g., a centered position of walkway member 56 relative to step assembly 54).

As indicated above, FIG. 6 is provided as an example. Other examples may differ from what is described in connection with FIG. 6.

INDUSTRIAL APPLICABILITY

The disclosed step assembly 54 and walkway member 56 may be used with any screed assembly where maintaining a central position of step assembly 54 and/or walkway member 56 is desired, and maintaining a level orientation of step assembly 54 (e.g., level with respect to the ground) over a full range of motion of the screed assembly is desired.

In operation, the movable connection between step frame 68 and step support members 66 (i.e., the movable connection provided by pins 90 and biasing members 92) permits step 70 of step assembly 54 to maintain a central position and level orientation during a movement of screed frame 52 (e.g., a crowning movement or a cross-sloping movement) without a risking damage to step assembly 54 from the stresses applied by screed frame 52. In this way, personnel may stand on step 70 (e.g., for observational purposes or for travel across screed assembly 50) with reduced difficulty and exertion as a result of the level orientation of step 70. In addition, the central position of step assembly 54 and walkway member 56 (e.g., provided by catch 94 and bumper members 96) that is maintained during movement of screed frame 52 provides an improved observational vantage for personnel, as a step assembly or a walkway member that is off-center or skewed may prevent an accurate visual assessment of whether paving operations are producing straight and centered roadway mat.

What is claimed is:

1. A screed assembly, comprising:
    a screed frame;
    a first step support member connected to the screed frame;
    a second step support member connected to the screed frame; and
    a step frame including a step, the step frame movably connected to the first step support member and the second step support member,
        the step frame movably connected to the first step support member by a first pin engaged with the first step support member and a slot of the step frame,
        the step frame movably connected to the second step support member by a second pin engaged with the second step support member and an aperture of the step frame,
        the step frame being biased to a position relative the first step support member and the second step support member by a first biasing member disposed between the step frame and the first step support member and a second biasing member disposed between the step frame and the second step support member,
        the first pin being disposed in the first biasing member, and
        the second pin being disposed in the second biasing member.

2. The screed assembly of claim 1, wherein the first biasing member is a first coil spring and the second biasing member is a second coil spring.

3. The screed assembly of claim 1, further comprising:
    a walkway member connected to the screed frame, the walkway member being pivotal between a standing position and a stowed position.

4. The screed assembly of claim 3, wherein the step frame includes a walkway projection that extends from the step frame, and
    wherein the walkway member includes a catch that surrounds a distal portion of the walkway projection in the standing position of the walkway member.

5. The screed assembly of claim 1, wherein a platform cover extends from the first step support member to the second step support member, and
    wherein the platform cover is pivotally connected to the first step support member or the second step support member.

6. The screed assembly of claim 1, wherein the screed frame includes a first lateral portion and a second lateral portion that are independently movable about a central line of the screed frame, and
    wherein the first step support member is connected to the first lateral portion of the screed frame and the second step support member is connected to the second lateral portion of the screed frame.

7. The screed assembly of claim 1, wherein the step frame includes a first well and a second well, wherein a first end portion of the first step support member is disposed in the first well and a second end portion of the second step support member is disposed in the second well, and wherein the first biasing member is disposed between the first end portion of the first step support member and a first inward wall of the first well, and the second biasing member is disposed between the second end portion of the second step support member and a second inward wall of the second well.

8. The screed assembly of claim 1, wherein the slot of the step frame is slidably engaged with the first pin and the aperture of the step frame is pivotally engaged with the second pin.

9. The screed assembly of claim 1, wherein the step is provided in an orientation that permits standing on the step by a user, and wherein the step is maintained in the orientation during one or more of:
a positive crowning movement of the screed frame,
a negative crowning movement of the screed frame, or
a cross-sloping movement of the screed frame.

10. The screed assembly of claim 1,
wherein, when the step frame is displaced from the position during a cross-sloping movement of the screed frame, at least one of the first biasing member or the second biasing member is in a compressed state.

11. The screed assembly of claim 1,
wherein the step is connected to the step frame by a rod engaged with the step.

12. A screed assembly, comprising:
a screed frame;
a step frame that includes a step and a walkway projection extending from the step frame; and
a walkway member connected to the screed frame, the walkway member being pivotal between a standing position and a stowed position,
the walkway member including a catch that surrounds a distal portion of the walkway projection in the standing position, and one or more bumper members proximate the distal portion of the walkway projection in the standing position or the stowed position.

13. The screed assembly of claim 12, wherein the walkway member is in a horizontal orientation in the standing position.

14. The screed assembly of claim 12, wherein the screed frame includes a first lateral portion and a second lateral portion that are independently movable about a central line of the screed frame,
wherein the walkway member is connected to the screed frame at a first connection interface with the first lateral portion and a second connection interface with the second lateral portion, and
wherein the walkway member is pivotal between the standing position and the stowed position with respect to an axis defined by the first connection interface and the second connection interface.

15. The screed assembly of claim 12, wherein a bumper member of the one or more bumper members is to contact the walkway projection during one or more of:
a positive crowning movement of the screed frame,
a negative crowning movement of the screed frame,
a vertical movement of the screed frame,
a sloping movement of the screed frame, or
a cross-sloping movement of the screed frame.

16. The screed assembly of claim 12, wherein the distal portion of the walkway projection includes a bumper projection orthogonal to the walkway projection, and
wherein the one or more bumper members are proximate the bumper projection.

17. A step assembly, comprising:
a first step support member to be connected to a screed frame;
a second step support member to be connected to the screed frame; and
a step frame including a step,
the step frame being movably connected to the first step support member and the second step support member,
the step frame being movably connected to the first step support member by a first pin engaged with the first step support member and a slot of the step frame,
the step frame being movably connected to the second step support member by a second pin engaged with the second step support member and an aperture of the step frame,
the step frame being biased to a position relative the first step support member and the second step support member by a first biasing member disposed between the step frame and the first step support member and a second biasing member disposed between the step frame and the second step support member,
the step frame including a well,
a first end portion of the first step support member being disposed in the well,
the first biasing member being disposed in the well,
the first pin being disposed in the first biasing member, and
the second pin being disposed in the second biasing member.

18. The step assembly of claim 17,
wherein the well is a first well,
wherein the step frame further includes a second well,
wherein a second end portion of the second step support member is disposed in the second well,
wherein the first biasing member is disposed between the first end portion of the first step support member and a first inward wall of the first well, and
wherein the second biasing member is disposed between the second end portion of the second step support member and a second inward wall of the second well.

19. The step assembly of claim 17, wherein the step is pivotal with respect to a longitudinal axis of the step between a standing position and a stowed position.

20. The step assembly of claim 17, wherein the step frame is slidable along the first pin and pivotal about the second pin.

* * * * *